US010828882B2

(12) United States Patent
Gerken et al.

(10) Patent No.: US 10,828,882 B2
(45) Date of Patent: Nov. 10, 2020

(54) SEPTUMIZATION OF CELLULAR CORES

(71) Applicant: The Boeing Company, Chicago, IL (US)

(72) Inventors: Noel Timothy Gerken, Maple Valley, WA (US); Eric Herrera, Coos Bay, OR (US); Nicholas John Patz, Benicia, CA (US)

(73) Assignee: The Boeing Company, Chicago, IL (US)

(*) Notice: Subject to any disclaimer, the term of this patent is extended or adjusted under 35 U.S.C. 154(b) by 319 days.

(21) Appl. No.: 15/878,448

(22) Filed: Jan. 24, 2018

(65) Prior Publication Data

US 2018/0162112 A1    Jun. 14, 2018

Related U.S. Application Data

(62) Division of application No. 14/326,890, filed on Jul. 9, 2014, now Pat. No. 9,931,825.

(51) Int. Cl.
B32B 37/14         (2006.01)
B29D 22/00         (2006.01)
(Continued)

(52) U.S. Cl.
CPC ............ *B32B 37/146* (2013.01); *B29D 22/00* (2013.01); *B29D 99/0089* (2013.01); *B32B 38/1866* (2013.01); *B32B 41/00* (2013.01); *B29K 2101/00* (2013.01); *B29K 2307/04* (2013.01); *B32B 3/12* (2013.01);
(Continued)

(58) Field of Classification Search
CPC ..... B29C 53/82; B29C 53/828; B29C 53/827; B29C 51/36; B29C 33/485; B29D 99/0089; B29D 24/005; B29D 24/008; B32B 37/142; B32B 37/146; B32B 3/12; B32B 2305/024; B32B 2605/18; B32B 2307/102; G10K 11/172; F02C 7/045; F02K 1/827; F05D 2250/283; F05D 2260/96; F05D 2260/963
See application file for complete search history.

(56) References Cited

U.S. PATENT DOCUMENTS 3,700,067 A    10/1972 Dobbs et al.
3,831,710 A     8/1974 Wirt
(Continued)

FOREIGN PATENT DOCUMENTS

CN    101827702 A    9/2010
CN    102300703 A    12/2011
(Continued)

OTHER PUBLICATIONS

The State Intellectual Property Office of China First Notification of Office Action, Search Report, and English translation, dated Jun. 5, 2018. regarding Application No. 201510357826.8, 14 pages.
(Continued)

*Primary Examiner* — Carson Gross
(74) *Attorney, Agent, or Firm* — Yee & Associates, P.C.

(57) ABSTRACT

A composite acoustic liner has a septumized cellular core. Septa are installed in the core as the individual core cells are being formed. Individual tools are used to both form the cells of the core and index the septa within the cells. The septa and the cellular core are cocured.

20 Claims, 8 Drawing Sheets

(51) Int. Cl.
- *B29D 99/00* (2010.01)
- *B32B 38/18* (2006.01)
- *B32B 41/00* (2006.01)
- *B29K 101/00* (2006.01)
- *B29K 307/04* (2006.01)
- *B32B 3/12* (2006.01)
- *G10K 11/172* (2006.01)
- *F02C 7/045* (2006.01)
- *F02K 1/82* (2006.01)

(52) U.S. Cl.
CPC ... *B32B 2305/024* (2013.01); *B32B 2307/102* (2013.01); *B32B 2605/18* (2013.01); *F02C 7/045* (2013.01); *F02K 1/827* (2013.01); *F05D 2250/283* (2013.01); *F05D 2260/96* (2013.01); *F05D 2260/963* (2013.01); *G10K 11/172* (2013.01)

(56) References Cited

U.S. PATENT DOCUMENTS

| | | | |
|---|---|---|---|
| 4,235,303 A | 11/1980 | Dhoore et al. | |
| 4,248,647 A | 2/1981 | Herron et al. | |
| 4,257,998 A | 3/1981 | Diepenbrock, Jr. et al. | |
| 4,265,955 A | 5/1981 | Harp et al. | |
| 4,384,020 A | 5/1983 | Beggs et al. | |
| 4,452,335 A | 6/1984 | Mathews et al. | |
| 4,465,725 A | 8/1984 | Reil | |
| 4,671,841 A | 6/1987 | Stephens | |
| 5,041,323 A | 8/1991 | Rose et al. | |
| 5,175,401 A | 12/1992 | Arcas et al. | |
| 5,543,198 A | 8/1996 | Wilson | |
| 5,645,668 A * | 7/1997 | Lin | B29C 53/821 156/169 |
| 6,114,652 A | 9/2000 | Clarke et al. | |
| 6,182,787 B1 | 2/2001 | Kraft et al. | |
| 6,509,081 B1 | 1/2003 | Diamond | |
| 6,607,625 B2 | 8/2003 | Andre et al. | |
| 6,767,606 B2 | 7/2004 | Jackson et al. | |
| 6,840,349 B2 | 1/2005 | Andre et al. | |
| 7,328,771 B2 | 2/2008 | Costa et al. | |
| 7,434,659 B2 | 10/2008 | Ayle | |
| 7,510,052 B2 | 3/2009 | Ayle | |
| 7,588,212 B2 | 9/2009 | Moe et al. | |
| 7,854,298 B2 | 12/2010 | Ayle | |
| 7,913,813 B1 | 3/2011 | Mathur | |
| 7,921,966 B2 | 4/2011 | Chiou et al. | |
| 8,037,967 B2 | 10/2011 | Mercat | |
| 8,047,329 B1 | 11/2011 | Douglas et al. | |
| 8,066,098 B2 | 11/2011 | Ayle | |
| 8,413,761 B2 | 4/2013 | Ayle | |
| 8,511,429 B1 | 8/2013 | Yu et al. | |
| 2005/0006529 A1 | 1/2005 | Moe et al. | |
| 2006/0219477 A1 | 10/2006 | Ayle | |
| 2010/0015385 A1* | 1/2010 | Woicke | F28F 25/087 428/98 |
| 2011/0012290 A1* | 1/2011 | Burchett | B29C 45/14778 264/261 |
| 2011/0262692 A1 | 10/2011 | Oyama | |
| 2012/0037449 A1 | 2/2012 | Ayle | |
| 2013/0062143 A1 | 3/2013 | Ichihashi | |
| 2013/0224410 A1 | 8/2013 | Nozawa | |
| 2016/0009067 A1 | 1/2016 | Gerken et al. | |

FOREIGN PATENT DOCUMENTS

| | | |
|---|---|---|
| CN | 102858629 A | 1/2013 |
| EP | 0352993 A1 | 1/1990 |
| EP | 2472509 A1 | 4/2012 |
| GB | 2056367 A | 3/1981 |
| GB | 2122540 A | 1/1984 |

OTHER PUBLICATIONS

"Hexweb Acousti-Cap," Hexcel Corporation, copyright 2010, 4 pages, accessed Jul. 29, 2013. http://www.hexcel.com/Resources/DataSheets/Brochure-Data-Sheets/HexWeb_Acousti-Cap.pdf.

"Purolator Acoustic Porous Metals," Purolator Advanced Filtration, copyright 2006, 3 pages, accessed Jul. 29, 2013. http://www.purolator-facet.com/acoustic.htm.

Herrera et al., "Acoustic Panel," U.S. Appl. No. 13/953,287, filed Jul. 29, 2013, 29 pages.

Butler et al., "Composite Laminates Having Hole Patterns Produced by Controlled Fiber Placement," U.S. Appl. No. 13/953,392, filed Jul. 29, 2013, 37 pages.

Butler et al., "Septumization of Honeycomb Sandwiches," U.S. Appl. No. 13/953,456, filed Jul. 29, 2013, 28 pages.

Han, "Sound Reduction by a Helmholtz Resonator," Masters Thesis, Lehigh University, Sep. 2008, 110 pages.

Liu et al., "A multiple degree of freedom electromechanical Helmholtz resonator," Acoustic Society of America, vol. 122, No. 1, Jul. 2007, pp. 291-301.

Office Action, dated Apr. 28, 2017, regarding U.S. Appl. No. 14/326,890, 18 pages.

Notice of Allowance, dated Nov. 9, 2017, regarding U.S. Appl. No. 14/326,890, 11 pages.

* cited by examiner

SEPTUMIZATION OF CELLULAR CORES

CROSS REFERENCE TO RELATED APPLICATIONS

The present application is a divisional application of U.S. patent application Ser. No. 14/326,890, filed on Jul. 9, 2014, entitled Septumization of Cellular Cores.

BACKGROUND INFORMATION

1. Field

The present disclosure generally relates to acoustic treatments for reducing noise, and deals more particularly with septumization of honeycomb cellular cores.

2. Background

Aircraft engines produce noise primarily due to rotating blades which compress the airflow as well as rotating blades which extract energy from the airflow and the high-speed airflow through the exhaust nozzles. In order to reduce noise and satisfy noise regulations governing commercial aircraft, aircraft engines may incorporate acoustic panels in various parts of the engine, such as in the nacelle inlets, as well as the aft bypass duct and primary nozzle. These acoustic panels, sometimes referred to as acoustic treatments or acoustic liners, may comprise a honeycomb core sandwiched between a perforated inner skin and a non-perforated outer skin. The honeycomb core often has a middle layer of porous material called a septum which is used to increase the acoustic performance of the liner. The design parameters of the septum in the cells of the honeycomb core usually consist of the porosity of the layer as well as the depth or location relative to the perforated inner skin. The cavities that are formed by the septums act as Helmholtz resonators that attenuate the engine noise.

There are at least three known methods for septumization of honeycomb cores, each of which requires the septa to be installed in the core in a separate process after the honeycomb core has been fabricated. The first method requires splitting the core and using an adhesive to bond a septum layer between the split cores, however this approach is time consuming, labor intensive and may decrease the mechanical performance of the core because it requires splitting the core. The second method involves a lost wax process which creates a buried septum, where a honeycomb core is pressed into wax. A thin layer of liquid resin floats on top of the wax which is then cured to form a solid layer and the wax is melted out of the honeycomb core. This buried septum process requires an extra step in which a laser is used to perforate the solid septum layer to the desired porosity. The third method involves using an automated robotic process where individual septum pieces with tabs are inserted into each honeycomb cell. The tabs of the individual septum pieces are bonded to the honeycomb cell walls by carefully dipping the honeycomb panel to a certain depth into a liquid adhesive. The process of installing the individual septum pieces can be time consuming and expensive. Accordingly, there is a need for a method of septumizing a honeycomb core used in an acoustic sandwich structure which obviates the need for installing individual septum pieces in the core cells, or splitting the core to allow the installation of a septum layer, or the many steps in using a lost wax process to create a solid septum layer and then using a laser to perforate the solid septum layer.

SUMMARY

The disclosed embodiments provide a method for septumizing cellular cores that may be employed in sandwich panels used for acoustic treatments. The disclosed method avoids the need for splitting the core during septum installation as well as the many manufacturing steps required in using the lost wax process or using automated robotic equipment to insert individual septums into each honeycomb cell. A large number of honeycomb core cells may be septumized quickly and easily. Septumization of the core is achieved as the cells of the core are being fabricated, thereby eliminating a separate step of placing and securing the septums within the core cells. The septums form an integral part of the core.

According to one disclosed embodiment, a method is provided of producing a septumized acoustic core. A plurality of individual composite septums are formed and individual septums are installed respectively on a plurality of tools. The cells are formed by wrapping composite sheets around the tools. The septums are affixed in indexed positions within the cells by cocuring the cellular core and the septums. The tools are removed from the cellular core after co-curing. The individual septums are installed by sleeving them over a male tool member, following which a female tool member is sleeved over the septum, such that the septum is held between the male and female tool numbers. Wrapping the composite sheets is performed by weaving the sheets around the tools, such that the composite sheets are brought into contact with the exposed sections of the septums. Forming the cellular core includes assembling an array of the tools, and indexing each of the tools relative to the sheets to locate the septums within the cells of the core. Forming the core further includes compacting the sheets against the tools.

According to another disclosed embodiment, a method is provided of producing a septumized cellular core. A plurality of cells are formed, each having cell walls and containing a composite septum forming, Forming the cells is performed by wrapping composite sheets around each of a plurality of composite septums. The composite septums are joined to the cell walls by co-curing the cells and the septums. The method may also include placing the septums respectively on a plurality of tools, including wrapping the composite sheets around each of the tools. Placing the septums respectively on the plurality of tools includes holding each of the septums between a male tool member and a female tool member, exposing a section of each of the septums, and wrapping composite sheets includes wrapping the composite sheets around the exposed section of each of the septums. Forming the plurality of cells includes compacting the composite sheets against each of the tools. The method may also include indexing each of the septums within one of the cells by adjusting a position of the tool before performing co-curing, and arranging the tools into a tool array corresponding to the cells. The tools are removed after the co-curing.

According to still another embodiment, a method is provided of producing an acoustic liner, comprising placing a septum on each of a plurality of tools, forming a cellular core having a plurality of cells, including wrapping composite sheets around the tools, bringing a composite sheets into contact with a section of each of the septums, cocuring the cellular core and the septums, removing the tools from the cellular core, and attaching first and second facesheets on opposite sides of the cellular core.

According to a further embodiment, apparatus is provided for septumizing a core having a plurality of cells each having a number of sides. The apparatus comprises matching male and female tool members adapted to have a septum held therebetween. Each of the male and female tool members has a first section substantially matching a shape of the cells, and a second section substantially matching the shape of the septum. The male and female tool members are axially aligned. The first section of each of the male and female tool members includes a plurality of flat sides equal to the number of sides of the cells. The second section of the male tool member includes a head adapted to have a septum sleeved thereover, and the second section of the female tool member is a cavity adapted to receive the head.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
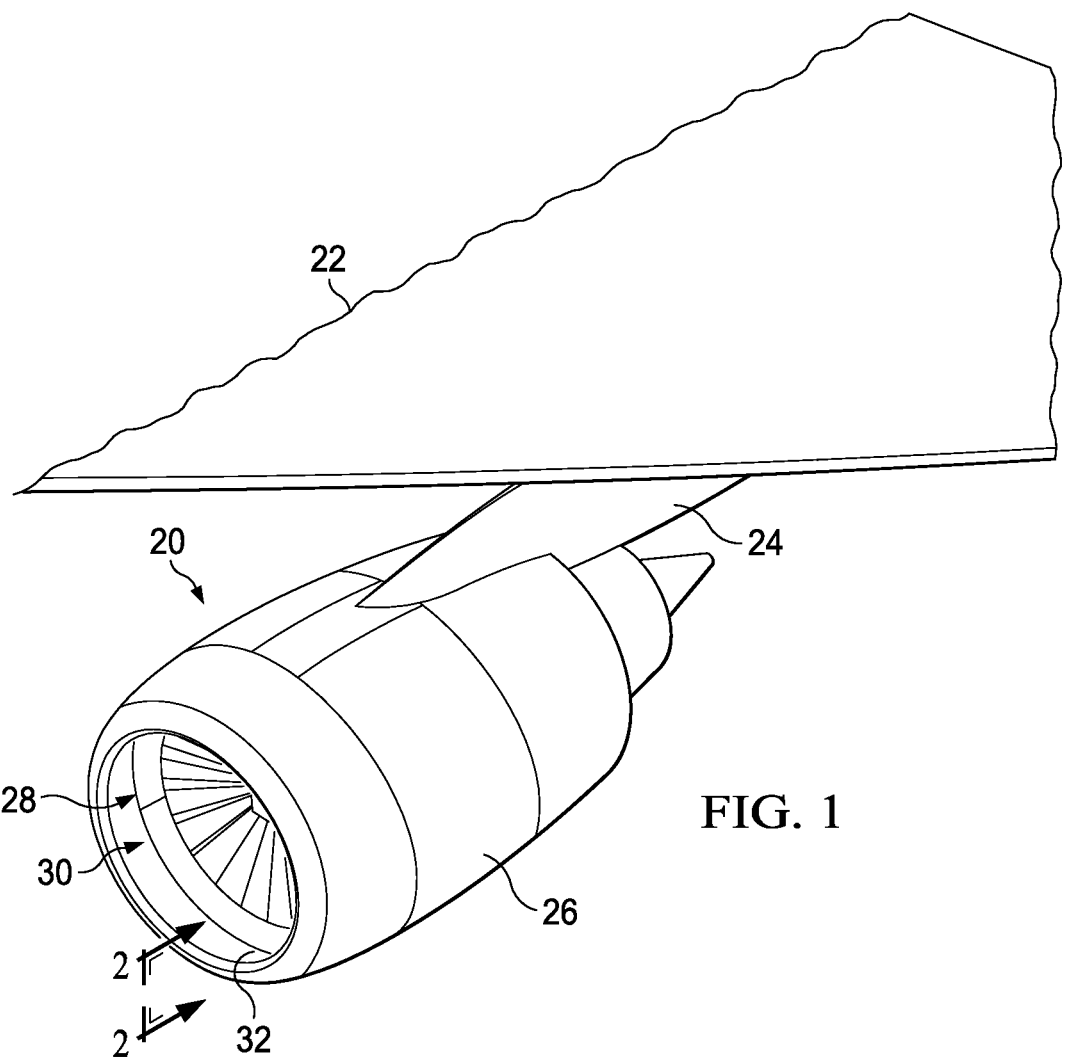
FIG. 1 is an illustration of a perspective view of a portion of the wing showing an engine having an acoustically treated inlet.

The disclosed embodiments relate to a method of septumizing a cellular core, such as a honeycomb core, forming part of an acoustic treatment that can be used in any of a wide variety of applications for attenuating noise. For example, and without limitation, referring to FIG. 1, a high bypass engine 20 is mounted an aircraft wing 22 by a pylon 24. The engine 20 includes a surrounding engine nacelle 26 having an air inlet 28. The air inlet 28 includes an acoustically treated area 30 in the form of an acoustic liner 32 for reducing noise caused by high airflow through the air inlet 28 into the engine 20.

Figure 2:
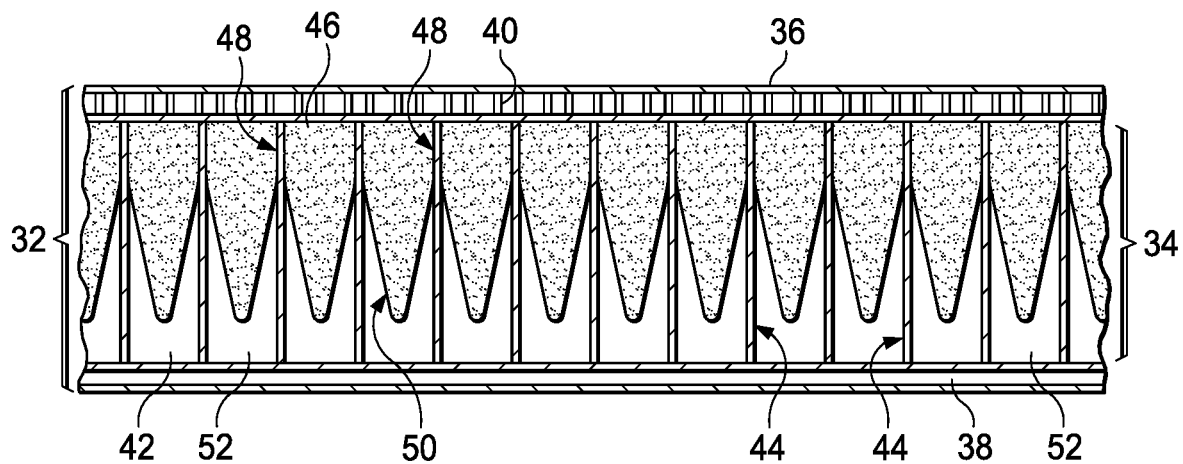
FIG. 2 is an illustration of a cross-sectional view taken along the line 2-2 in FIG. 1, showing a portion of an acoustic liner.
Figure 3:
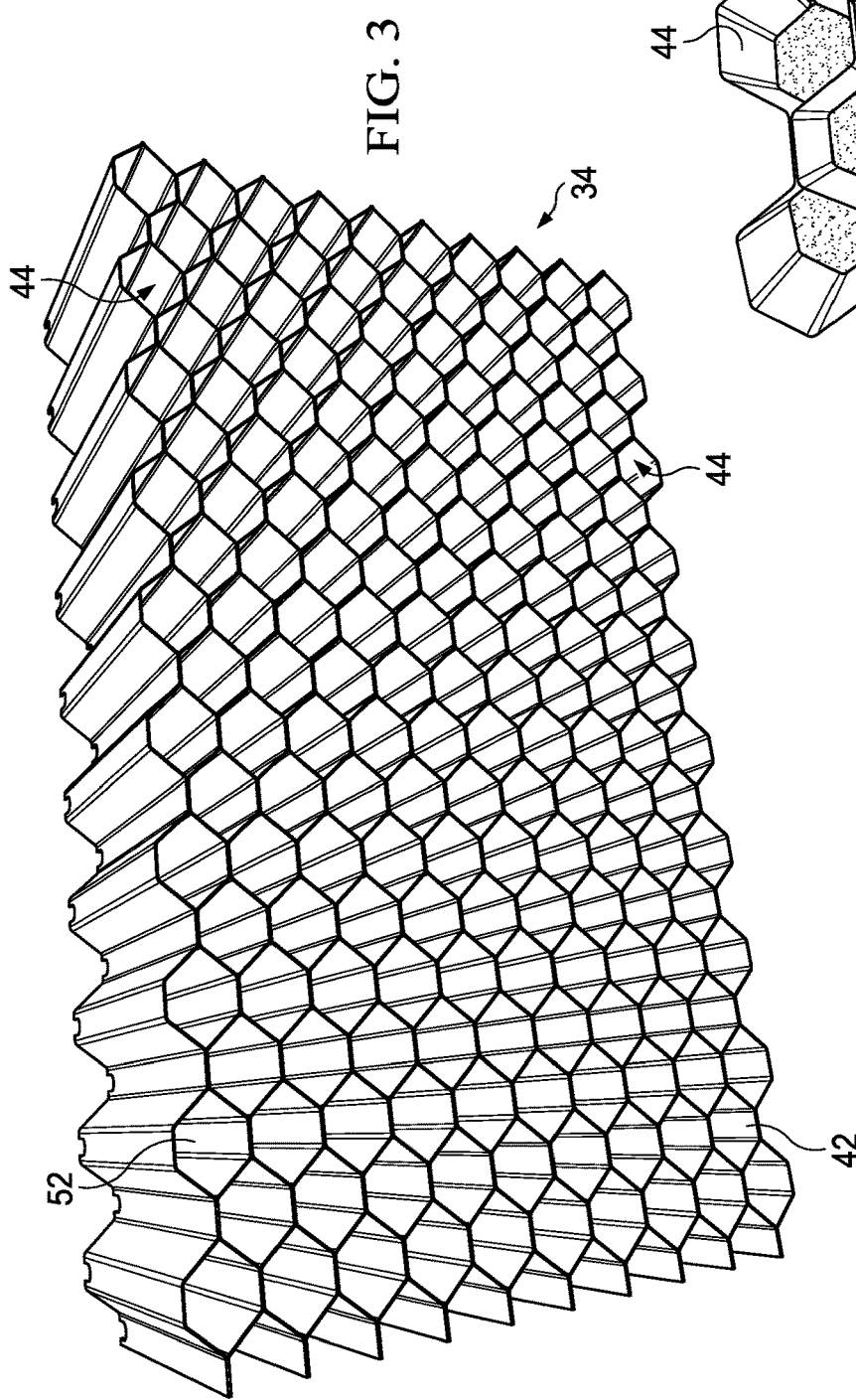
FIG. 3 is an illustration of a bottom, perspective view of the cellular core forming part of the acoustic liner shown in FIG. 2.
Figure 4:
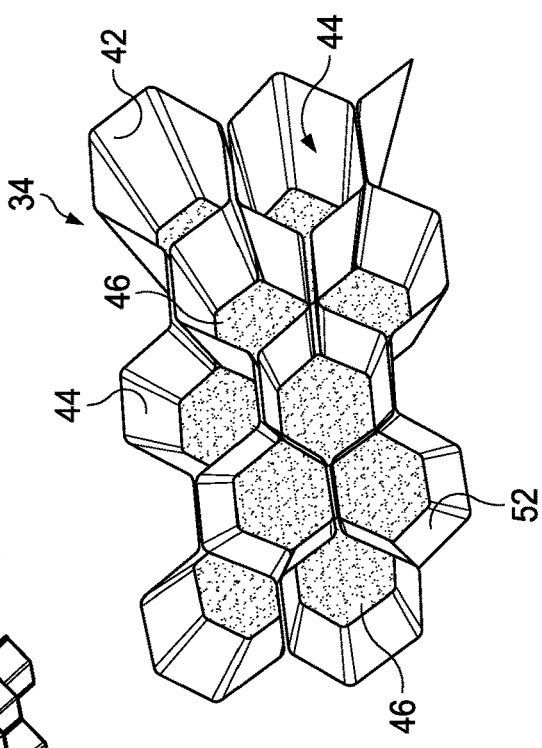
FIG. 4 is an illustration of a bottom isometric view of a portion of the cellular core, showing the bottom ends of septa.

Attention is now directed to FIGS. 2-4 which illustrate additional details of the acoustic liner 32, including a septumized acoustic core. The acoustic liner 32 is a sandwich panel construction (see FIG. 2) which broadly comprises a cellular honeycomb core 34, sometimes referred to herein as a cellular core 34, sandwiched between inner and outer facesheets 36, 38 respectively. The inner facesheet 36 includes a multiplicity of perforations 40 therein which allow sound waves, including noise to pass through the inner facesheet 36 into the cellular core 34. The inner facesheet 36 is attached to the top of the honeycomb core 34 by any suitable process such as adhesive bonding. Similarly, the outer facesheet 38 may be attached to the bottom the cellular core 34 by adhesive bonding.

In the illustrated embodiment, the inner and outer facesheets 36, 38 respectively each may comprise a composite laminate such as a CFRP (carbon fiber reinforced plastic) however, either of these facesheets may comprise other materials. The cellular core 34 is formed of a multiplicity of individual polygonal cells 42 defined by a number of cell walls 44. In the illustrated example, the cells 42 are hexagonal, however other cell geometries are possible. The honeycomb core 34 is septumized by a plurality of individual composite septums 46 which are integral with the core 34. The septa 46 are perforated or may be formed from a porous material such as a mesh or fabric that allows a portion of the sound waves to pass through the septa 46, downwardly through the cells 42 toward the outer facesheet 38.

The individual septums 46, collectively referred to as septa 46, have an upper section 48 and a lower section 50. The upper section 40 of the septa 46 have substantially the same cross-sectional shaped as the cells 42 (hexagonal in the illustrated embodiment) and are joined to the cell walls 44 to fix the position of the septa 46 within the cells 42. In the illustrated embodiment, the cell walls 44 and the septa 46 may be formed of a composite fabric (woven or knitted) such as a PEEK fabric, however other materials are possible. As will become later apparent, the use of composite septa 46 and composite cell walls 44 allow the septa 46 to be joined to the cell walls 44 by co-curing after the cellular core 34 has been assembled, thereby integrating the septa 46 into the cellular core 34.

The lower section 50 of the septa 46 extends down into the cells 42 a desired depth, forming cavities 52 within the cells 42 of a preselected volume, shape and surface area which achieve a desired acoustic performance for a chosen application. For example, in the case of an acoustic liner 32 for aircraft applications, the size, shape and surface area of the septa 46 may be selected to form resonant cavities 52 that assist in canceling or damping sound waves/noise flowing over the acoustic liner 32 which enter cellular core 34 through the perforations 40 in the inner facesheet 36.

In the illustrated embodiment, the lower section 50 of the septa 46 is generally conical in shape, however the septa 46 may have other shapes which may be constant or varying over the area of the cellular core 34, allowing the acoustic liner 32 to be tuned in different areas to attenuate different types of noise, such as noises in different frequency ranges. Also, while the upper sections 48 of the septa 46 are positioned at the top of the cells 42 in the illustrated embodiment, in other embodiments the septa 46 may be positioned lower within the cells 42 such that the upper sections 48 are spaced below the top of the cells 42.

Figure 7:
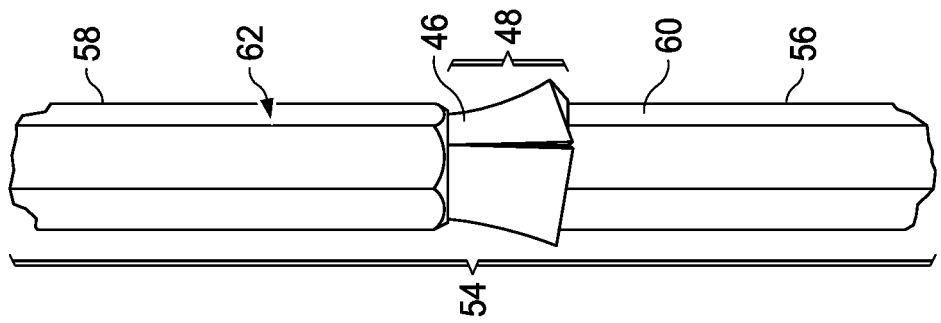
FIG. 7 is an illustration of a perspective view showing a septum held between male and female tool members.
Figure 6:
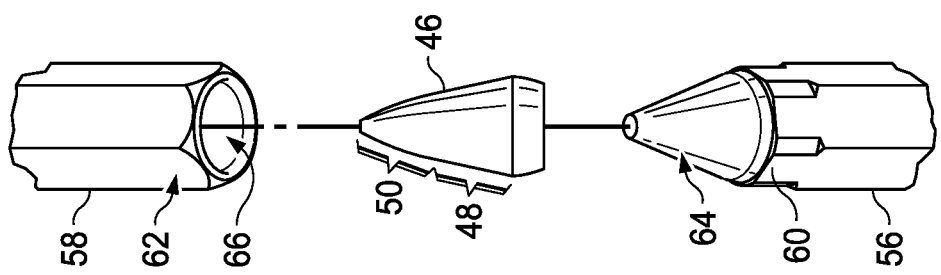
FIG. 6 is an illustration similar to FIG. 5 but showing placement of a septum between the male and female tool members.
Figure 5:
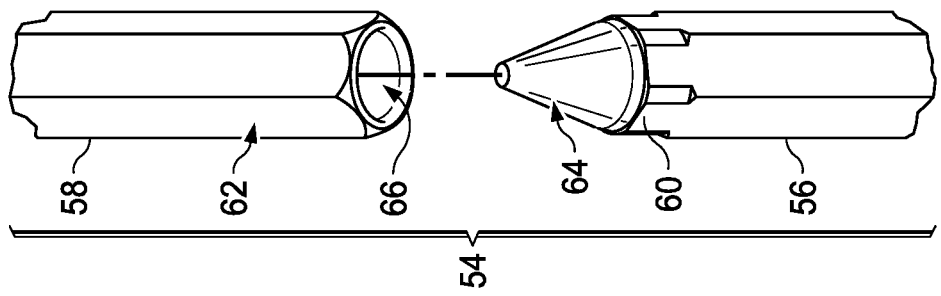
FIG. 5 is an illustration of an exploded, perspective view of a tool for laying up and cocuring the cellular core with the septa.

Attention is now directed to FIGS. 5-7 which illustrate a tool 54 that is used to both layup and cure the cellular core 34. The tool 54 comprises an elongate, male tool member 56 and an elongate female tool member 58. The tool members 56, 58 are axially aligned and function as a matched toolset. Each of the male and female tool member 56, 58 respectively have outer surfaces 60, 62 that substantially match the cross-sectional shape of the cells 42. In the illustrated example, the outer surfaces 60, 62 comprise flat sides that are equal to the number of sides of the cells 42. The outer surfaces 60, 62 act as mandrel-like layup surfaces, as will be discussed in more detail below.

The male tool member 56 includes a conically shaped tool head 64 that mates with, and is received within a conical tool cavity 66. The tool head 64 is configured to have one of the septums 46 sleeved thereover. The length of the septum 46 is greater than the length of the tool head 64. After sleeving a septum 46 over the tool head 64, the tool members 56, 58 are closed by axially drawing them together. When the tool members 56, 58 have been drawn together, capturing the septum 46 therebetween, the lower section 50 of the septum 46 is trapped inside the conical tool cavity 66, while the upper section 48 is exposed and extends down over the outer surface 60 of the male tool member 56.

Figure 8:
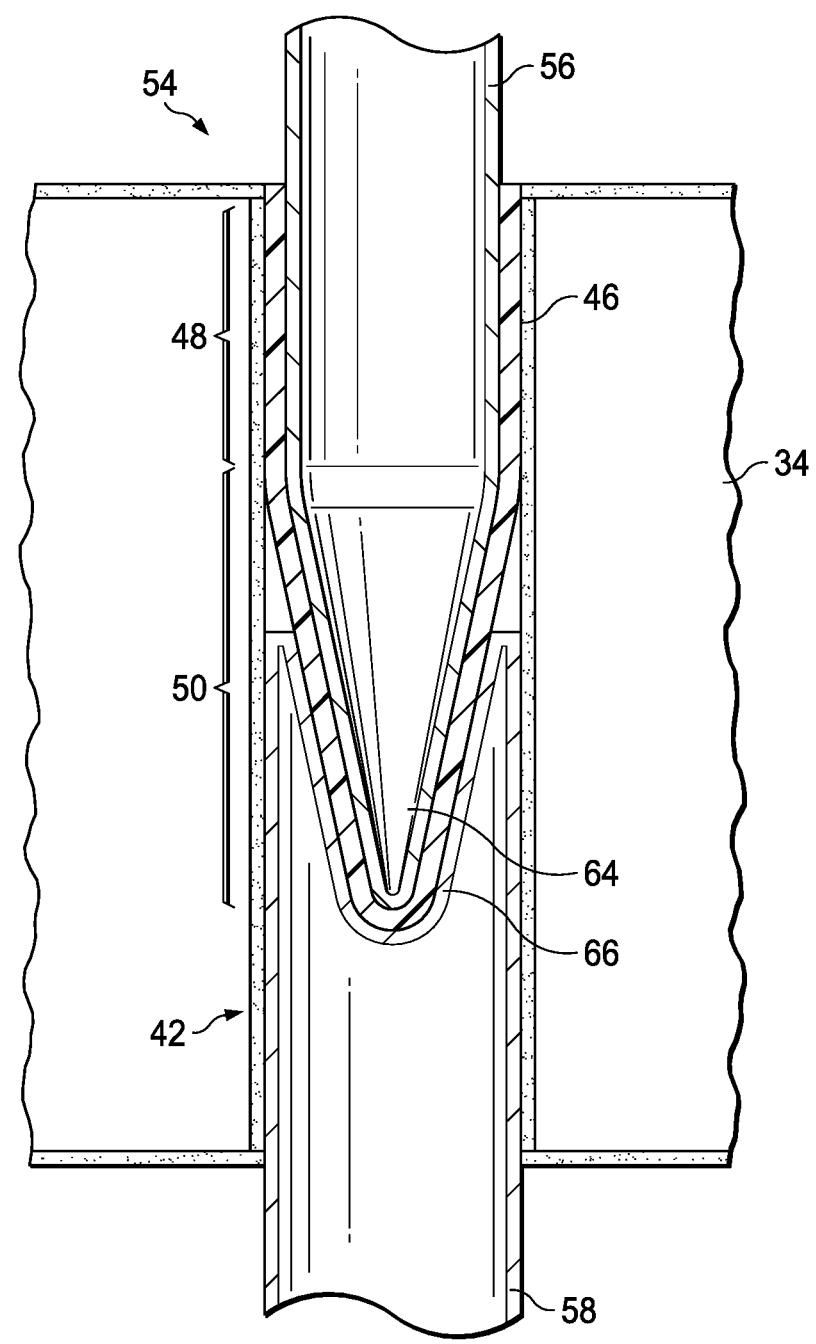
FIG. 8 is an illustration of a cross-sectional view showing the tool and a septum indexed within one of the cells of the core.

Referring now to FIGS. 8-12, the tool 54 shown in FIGS. 5-7 may be employed to layup, form and cure the cellular core 34 along with the septa 46. Septums 46 are loaded into a plurality of the tools 54, with each septum 46 captured and held between male and female tool members 56, 58 respectively (FIG. 8). Each of the tools 54 is then wrapped 75 (FIG. 11) with at least one sheet 70 of composite prepreg using any suitable technique, including but not limited to manual wrapping and automated equipment wrapping. During this wrapping process, the sheets 70 are formed against the outer, hexagon shape surfaces 60, 62 of the male and female tool members 56, 58. The forming of the sheet 70 against the surfaces 60, 62 effectively forms the cell walls 44. Simultaneously, as the sheet 70 is wrapped around the tools 54, the entire periphery of the upper exposed section 48 of the septa 46 is brought into contact with the surrounding sheet 70.

Figure 9:
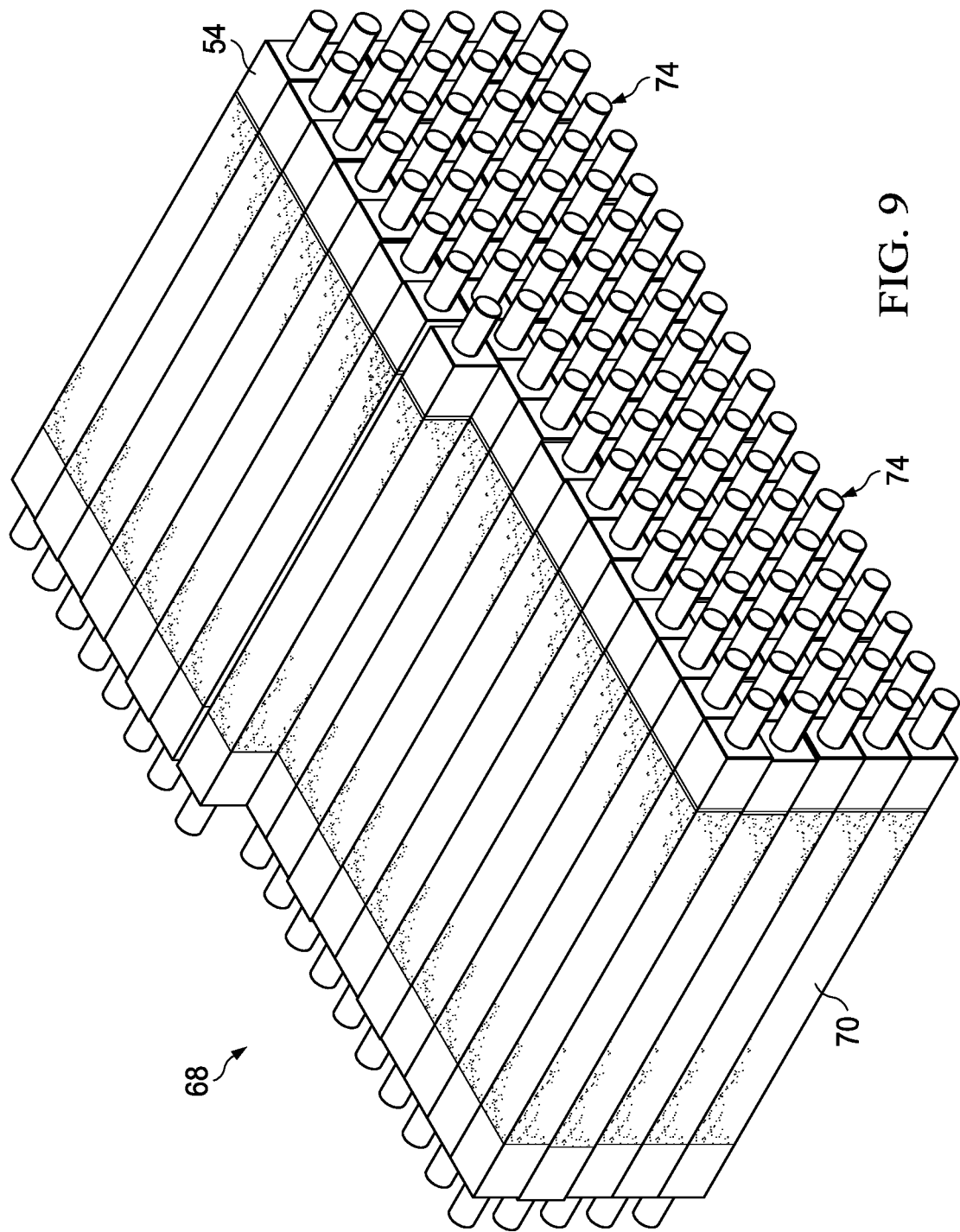
FIG. 9 is an illustration of a perspective view of a layup tool assembly during wrapping of the tools.
Figure 10:
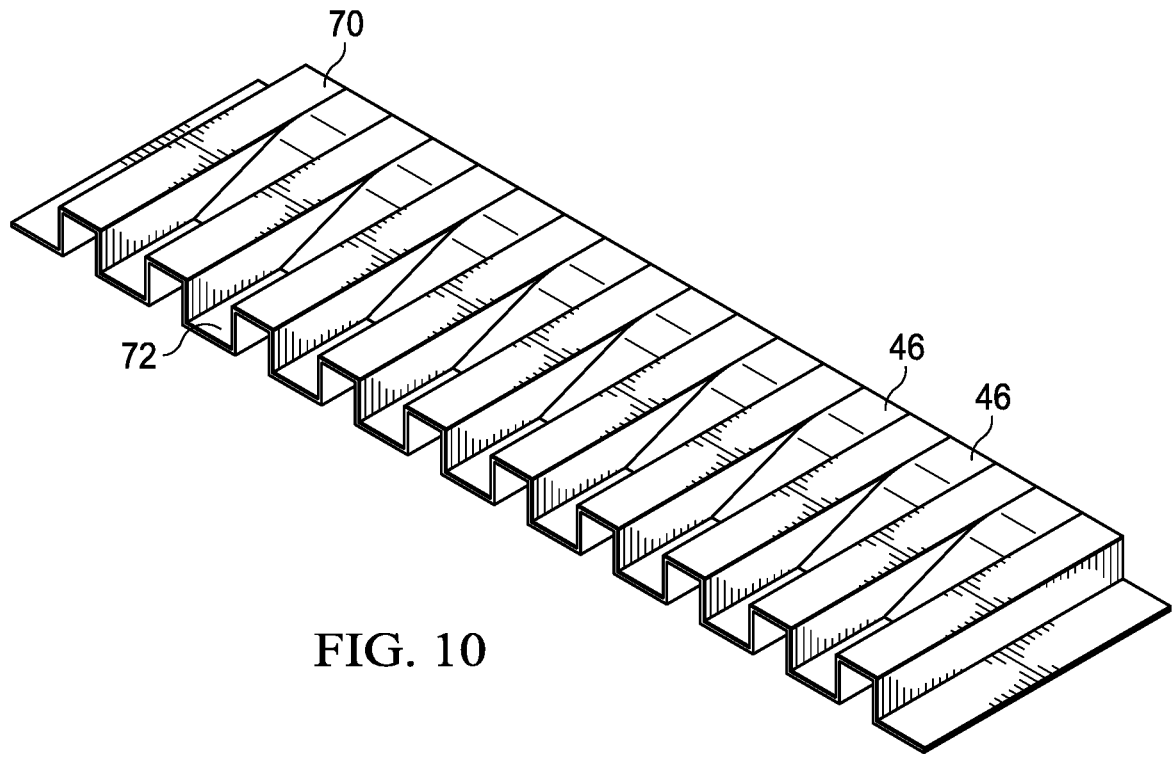
FIG. 10 is an illustration of a perspective view of partially formed individual sheets and the placement of septums in channels formed in the sheets.
Figure 11:
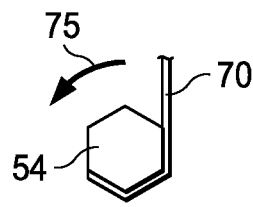
FIG. 11 is a diagrammatic illustration of a tool in the process of being wrapped in a sheet.

After being wrapped, each of the tools 54 is placed in a stack 85 (FIG. 12) formed by nested rows 74 of wrapped tools 54. The process of wrapping the tools 54 and placing them in the stack is continued until a complete layup tool assembly 68 has been formed, as shown in FIG. 9. As each tool 54 is placed 85 in the stack, its longitudinal position is adjusted to index the upper portion 48 of the septum 46 in order to fix the location (longitudinal position) of the septum 46 within a cell 42.

Figure 12:
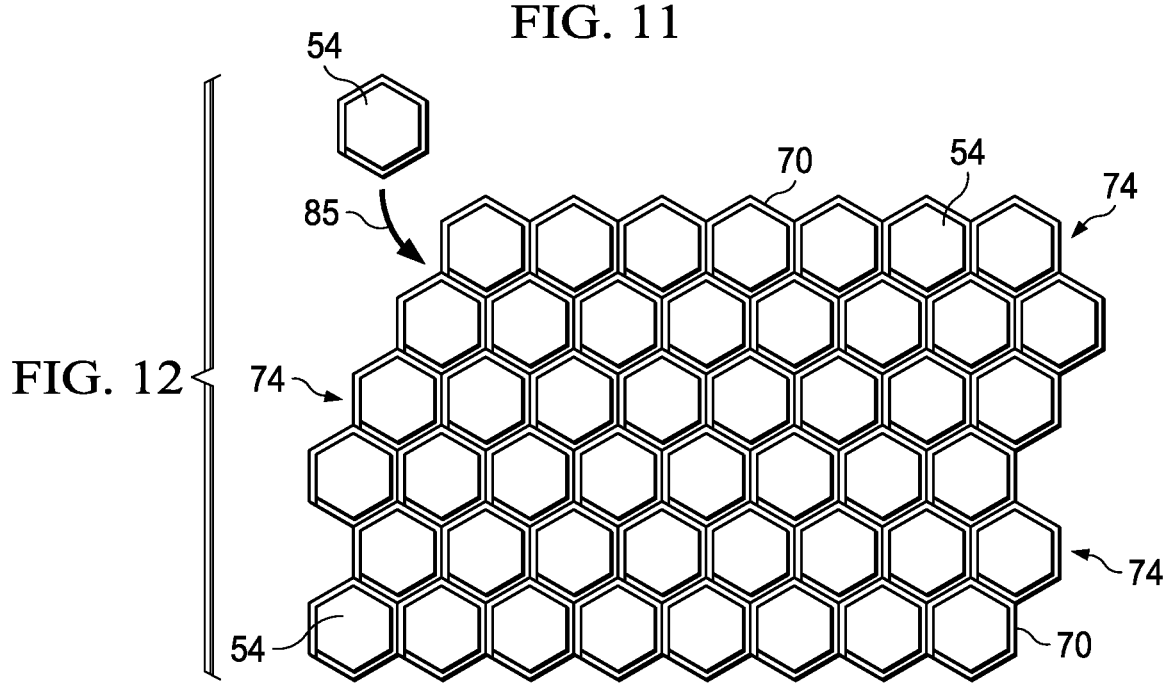
FIG. 12 is a diagrammatic illustration of a nested stack of wrapped tools forming the layup tool assembly shown in FIG. 9.

Depending upon the cross-sectional shape of the cells 42, the rows 74 of the tools 54 nest together as shown in FIG. 12, so that the outer tool surfaces 60, compress the sheet 70 when compaction pressure is applied to the tool array 68 using a compression press, vacuum bag pressure and/or autoclave pressure. As compaction pressure is applied to the formed sheet by the tools 54, the upper exposed sections 48 of the composite septum 46 are compacted against the surrounding cell walls 44. During a cure cycle, with the application of this compaction pressure along with heat, the upper exposed sections 48 of the septa 46 are co-cured with the surrounding cell walls 44, thereby fixing the septa 46 in indexed positions within the cells 42.

Figure 13:
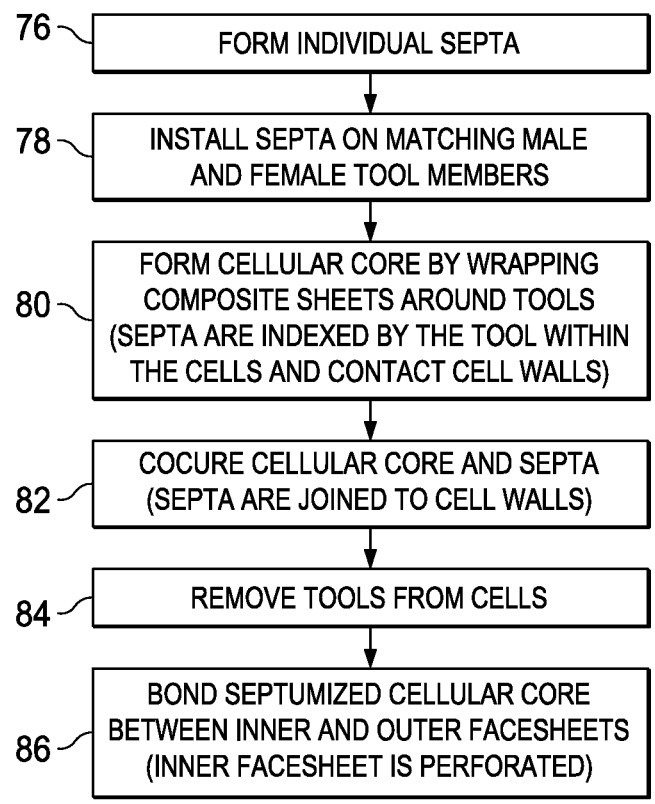
FIG. 13 is an illustration of a flow diagram broadly illustrates the steps of a method of fabricating an acoustic liner.

Attention is now directed to FIG. 13 which broadly illustrates the overall steps of a method of fabricating an acoustic liner 32 in which septa 46 are installed within the cells 42 of the cellular core 34 as the cellular core 34 is being fabricated. At step 76, the septa 46 are fabricated using any suitable technique, such as by weaving, knitting or joining together two layers of composite fabric. At step 76, the septa 46 are installed in individual tools 54 such that each septum 46 is held between matching male and female tool members 56, 58. At step 80, a cellular core 34 is formed by wrapping composite sheets 70 around each of the tools 54. During this wrapping process, the septa 46 are longitudinally indexed within the cells 42 and are brought into circumferential contact with the cell walls 44. At step 82, the cellular core 34 and the septa 46 are co-cured, thereby joining the septa 46 to the cell walls 44, and integrating the septa 46 into the cellular core 34.

During the cure process, the tools 54 act as cure mandrels which maintain the shape of the cells 42 and expand to apply compaction pressure which loads the septa 46 against the cell walls 44. Following curing, at step 84, the tools 54 are removed from the cells 42 by separating the male and female tool members 56, 58 and withdrawing them from opposite ends of the cells 42. At 86, depending upon the application, the septumized cellular core 34 is bonded between inner and outer facesheets 36, 38. The inner facesheet 36 is perforated to allow sound waves to enter the cells 42 and pass through the septa 46.

Figure 14:
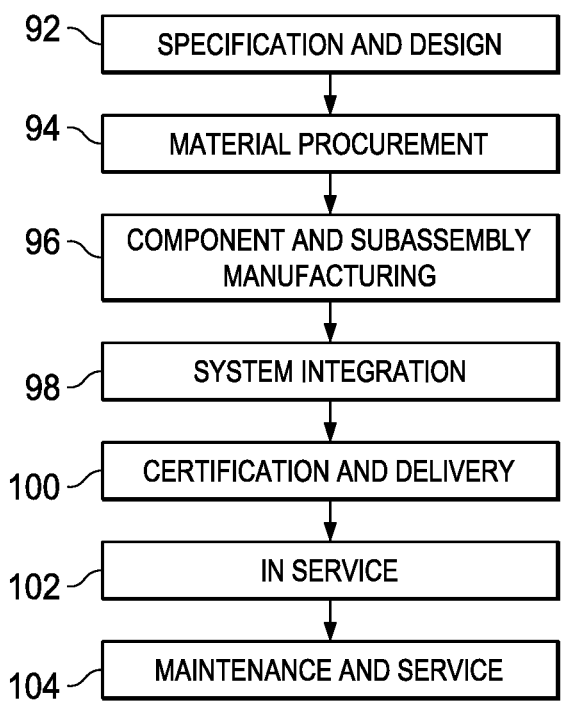
FIG. 14 is an illustration of a flow diagram of aircraft production and service methodology.
Figure 15:
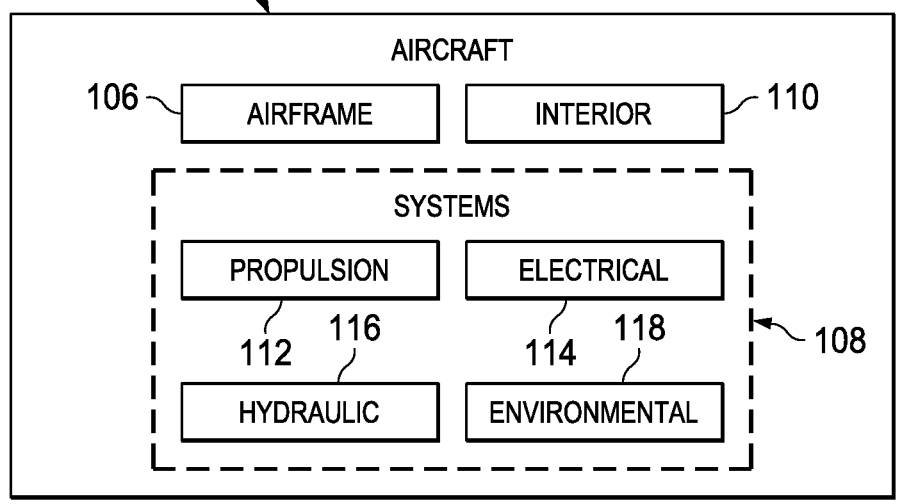
FIG. 15 is illustration of a block diagram of an aircraft.

Embodiments of the disclosure may find use in a variety of potential applications, particularly in the transportation industry, including for example, aerospace, marine, automotive applications and other application where acoustic treatments such as acoustic liners may be used. Thus, referring now to FIGS. 14 and 15, embodiments of the disclosure may be used in the context of an aircraft manufacturing and service method 88 as shown in FIG. 14 and an aircraft 90 as shown in FIG. 15. Aircraft applications of the disclosed embodiments may include, for example, without limitation, acoustic liners for engine nacelles. During pre-production, exemplary method 88 may include specification and design 92 of the aircraft 90 and material procurement 94. During production, component and subassembly manufacturing 96 and system integration 98 of the aircraft 90 takes place. Thereafter, the aircraft 90 may go through certification and delivery 100 in order to be placed in service 102. While in service by a customer, the aircraft 90 is scheduled for routine maintenance and service 104, which may also include modification, reconfiguration, refurbishment, and so on.

Each of the processes of method 88 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 15, the aircraft 90 produced by exemplary method 88 may include an airframe 106 with a plurality of systems 108 and an interior 110. Examples of high-level systems 108 include one or more of a propulsion system 112, an electrical system 114, a hydraulic system 116 and an environmental system 118. Any number of other systems may be included. The propulsion system 112 may include engine nacelles that are provided with acoustic liners in accordance with the disclosed embodiments. Although an aerospace example is shown, the principles of the disclosure may be applied to other industries, such as the marine and automotive industries.

Systems and methods embodied herein may be employed during any one or more of the stages of the production and service method 88. For example, components or subassemblies corresponding to production process 96 may be fabricated or manufactured in a manner similar to components or subassemblies produced while the aircraft is in service. Also, one or more apparatus embodiments, method embodiments, or a combination thereof may be utilized during the production stages 96, 98, for example, by substantially expediting assembly of or reducing the cost of an aircraft 90. Similarly, one or more of apparatus embodiments, method embodiments, or a combination thereof may be utilized while the aircraft 90 is in service 104.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus configured to septumize a core that comprises a plurality of cells, such that the apparatus comprises:
   male and female tool members configured to hold a septum therebetween, such that each of the male and female tool members respectively comprises:
      a first section that comprises an exterior configured as a mandrel that comprises a first shape that substantially matches and aligns with a shape of an exterior of a first section of the opposing tool member and matches a shape of an interior of a cell in the plurality of cells; and
      a second section that comprises a second shape that substantially matches a shape of the septum.

2. The apparatus of claim 1, wherein the male and female tool members are axially aligned.

3. The apparatus of claim 1, wherein the first section of each of the male and female tool members includes a plurality of flat sides equal to the number of sides of the cells.

4. The apparatus of claim 1, wherein:
   the second section of the male tool member is a head adapted to have a septum sleeved thereover, and
   the second section of the female tool member is a cavity adapted to receive the head.

5. The apparatus of claim 4, wherein:
   the septum has a length
   the head has a length less than the length of the septum causing a section of the septum to be exposed.

6. An apparatus configured to form an acoustic core that comprises a septum, such that the apparatus comprises:
   an elongate male tool member that comprises a conically shaped tool head configured to:
      receive the septum that comprises an upper section, and a lower section that comprises a conical shape; and
      mate with and be received by a conical tool cavity in an elongate female tool member; and
   the elongate female tool member that comprises the conical tool cavity configured to trap the lower section of the septum such that the upper section of the septum extends over an outer surface of the elongate male tool member; wherein the elongate male tool member and the elongate female tool member are axially aligned and form a matched toolset.

7. The apparatus of claim 6, wherein the elongate male tool member has a plurality of first outer surfaces that substantially match a cross sectional shape of a cell.

8. The apparatus of claim 7, wherein the elongate female tool member has a plurality of second outer surfaces that substantially match the cross sectional shape of the cell.

9. The apparatus of claim 7, wherein the plurality of first outer surfaces comprise flat sides that are equal to the number of sides of the cell.

10. The apparatus of claim 8, wherein the plurality of second outer surfaces comprise flat sides that are equal to the number of sides of the cell.

11. The apparatus of claim 7, wherein the plurality of first surfaces are configured as layup surfaces.

12. The apparatus of claim 8, wherein the plurality of second surfaces are configured as layup surfaces.

13. An apparatus configured to form a cell around a septum, such that the apparatus comprises:
   an elongate male cure mandrel that comprises:
      a body that comprises an exterior surface that comprises a shape that corresponds to a desired shape for an interior of a first portion of the cell; and
      a conically shaped tool head configured to:
         receive a septum that comprises an upper section, and a lower section that comprises a conical shape; and
         be received by, mate with, and release from a conical tool cavity in an elongate female cure mandrel that comprises:
            an exterior surface that comprises a shape that corresponds to a desired shape for an interior of a second portion of the cell; and
            the conical tool cavity configured to trap the lower section of the septum such that the upper section of the septum extends over an outer surface of the elongate male cure mandrel; wherein the elongate male cure mandrel and the elongate female cure mandrel align axially and form a matched toolset.

14. The apparatus of claim 13, wherein the elongate female cure mandrel includes the conical tool cavity that comprises a size and a shape configured to receive, mate with, and release the conically shaped tool head and the lower section of the septum.

15. The apparatus of claim 14, wherein the conically shaped tool head is configured to have a septum sleeved thereover.

16. The apparatus of claim 15, wherein the length of the septum is greater than a length of the conically shaped tool head.

17. The apparatus of claim 15, wherein the elongate male cure mandrel and the elongate female cure mandrel are configured to be mated by being axially drawn together.

18. The apparatus of claim 17, wherein the elongate male cure mandrel and the elongate female cure mandrel are configured to capture the septum so that a lower section of the septum is trapped inside the conical tool cavity while an upper section of the septum is exposed and extends down over the exterior surface of the elongate male cure mandrel.

19. The apparatus of claim 17, wherein the elongate male cure mandrel and the elongate female cure mandrel are each respectively configured to layup, form and cure a cellular core along with a septum.

20. The apparatus of claim 17, further comprising a hexagon shaped outer surface of the male and female cure mandrels.

* * * * *